March 1, 1938.  J. F. PRICE  2,109,849
APPARATUS FOR ACCURATELY POSITIONING WORK RELATIVE TO A TOOL
Filed Sept. 22, 1936  2 Sheets-Sheet 2
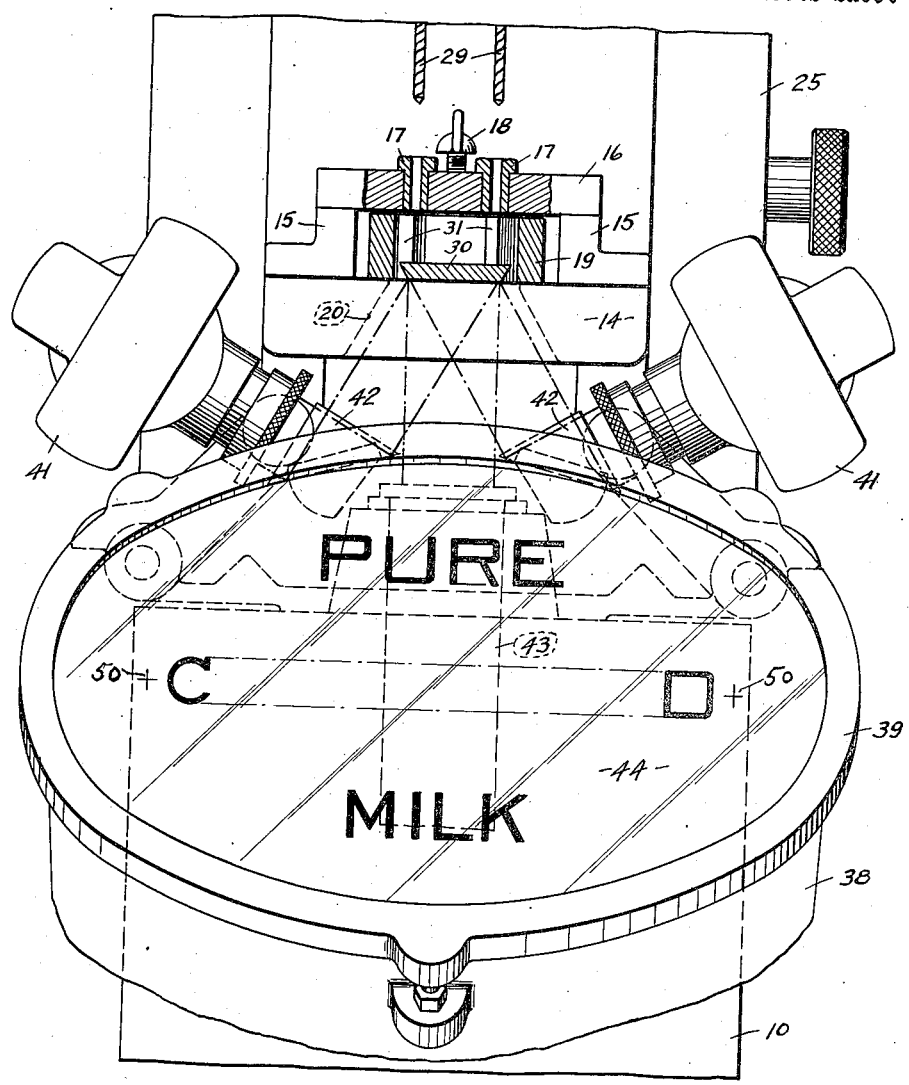
FIG_2_
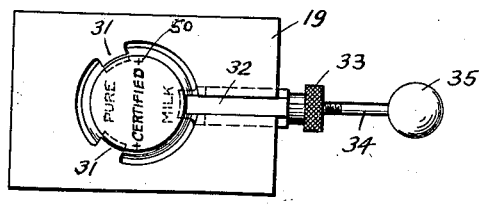
FIG_3_
INVENTOR:
John F. Price,
BY Bodell & Thompson
ATTORNEYS.

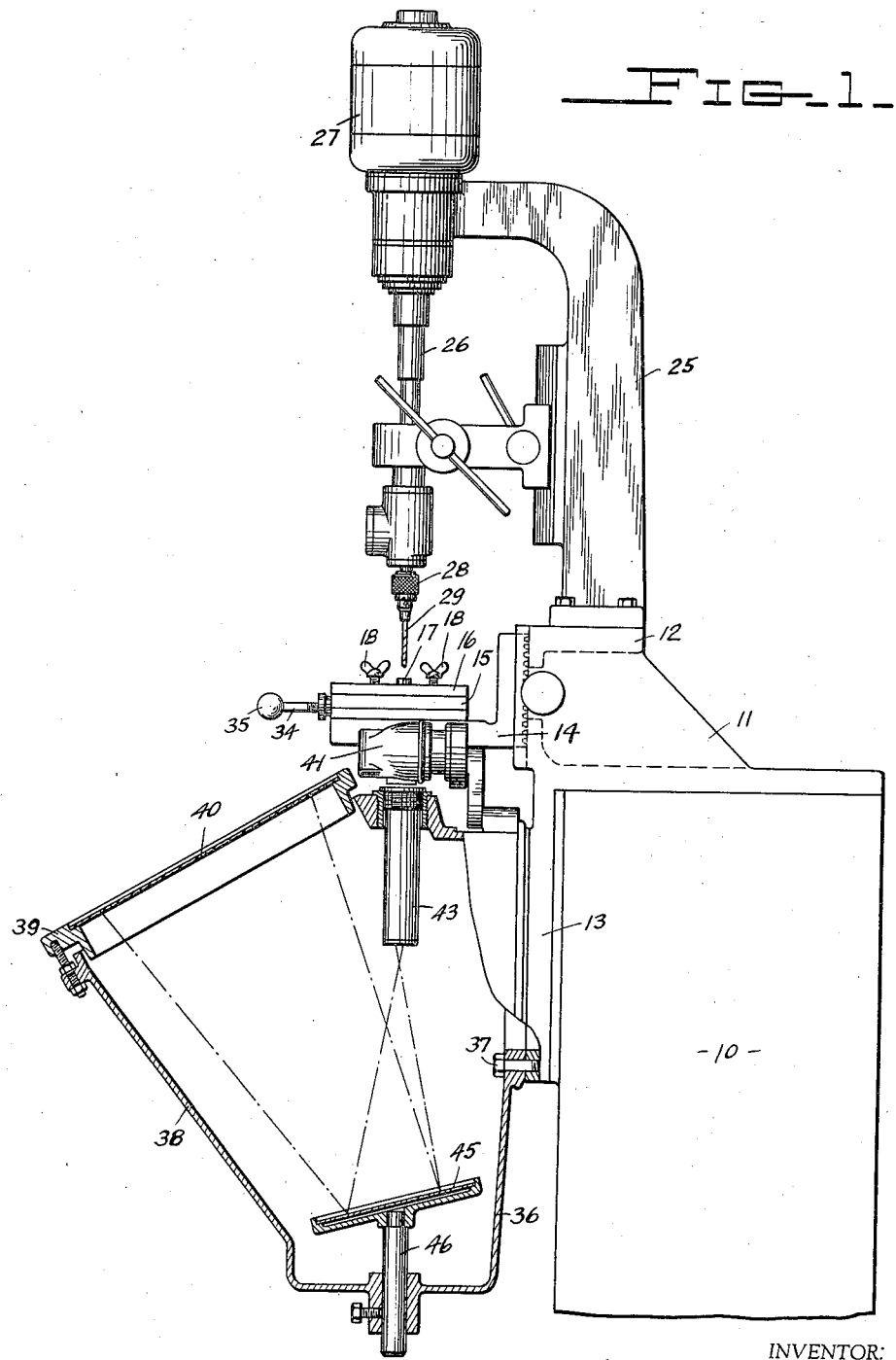

Patented Mar. 1, 1938

2,109,849

UNITED STATES PATENT OFFICE 2,109,849

APPARATUS FOR ACCURATELY POSITIONING WORK RELATIVE TO A TOOL

John F. Price, Fulton, N. Y., assignor to Oswego Falls Corporation, Fulton, N. Y., a corporation of New York Application September 22, 1936, Serial No. 101,984

10 Claims. (Cl. 77—5)

This invention relates to apparatus for definitely or accurately positioning pieces of work relative to a tool for operating upon the pieces of work. With the apparatus herein described, it is possible to quickly and conveniently position a piece of work in accurate relationship to the tool.

The invention is particularly applicable where it is necessary that the operation of the tool on each of a plurality of pieces of work be operated upon in certain relation to some previous operation performed on each piece.

The invention consists in the novel combinations and constructions of the apparatus hereinafter set forth and claimed.

In describing this invention, reference is made to the accompanying drawings in which like characters designate corresponding parts in all the views.

Figure 1 is a side elevation of the apparatus partly in section.

Figure 2 is a front elevation partly in section.

Figure 3 is a bottom plan view of the work holder, or vise.

The apparatus consists generally of a suitable frame, a work holder, a chart having an indicia thereon, the chart being so arranged as to locate the indicia in a predetermined fixed position relative to the tool, an optical system or train which is operable to direct light upon the work and reflect an image of the work, or portions thereof, on the chart, the work being movable to bring the reflected image of the work in alinement or register with the markings upon said chart.

The frame may be of any suitable form or construction, and is here shown as comprising a base portion 10 which preferably rests upon the floor and acts as a pedestal for the device. A supporting member 11 is secured to the base and comprises an upwardly extending portion 12 and a depending portion 13. A work supporting table 14 is mounted upon the front side of the upwardly extending portion 12 of the support 11 and is adjustable vertically relatively to the support 11.

The work supporting table 14 may be of any suitable construction to adequately support the particular work being operated upon. As here shown, the table 14 is provided with a box structure comprising a pair of spaced apart angular side members 15 rigidly secured to the table 14, and a top plate 16 which in turn is rigidly secured to the upper edges of the side members 15. The top plate 16, in this instance, is provided with one or more drill bushings 17, and with one or more clamping screws 18.

The work may rest upon the top surface of the table 14 and be freely shiftable thereon by the operator and held in operative position by the operator, or it may be more practical, in certain instances, to mount the work in a suitable work holder, or vise, which is shiftable on the table 14 and which may be clamped in operative position.

The embodiment of the invention is shown as being particularly adapted to perform a drilling operation on comparatively small pieces of work, and in this connection a work holder, or vise, is employed which consists of a block 19 of slightly less thickness than the distance between the top of the table 14 and the under side of the top plate 16. The block 19 is also of appreciably less width than the distance between the inner sides of the side members 15, whereby the block 19 may be shifted, or adjusted, in any direction on the horizontal plane relative to the table 14 and the box structure including the drilling bushings 17. The table 14 is also provided with an aperture 20 arranged centrally below the box structure. The purpose for the aperture 20 will be hereinafter explained.

It will be apparent as the description proceeds that an infinite number of different operations may be performed on different pieces and kinds of work, it being necessary only to employ a tool suitable to perform the desired operation and to provide means for holding the work on the table while it is being operated upon, which will depend largely upon the size and type of the work.

As here shown, the apparatus is arranged to perform a drilling operation on small disks. The mechanism for effecting this operation comprises a suitable column 25 in which is supported a pair of spindles 26 operated by a source of power, as a motor 27. The lower end of the spindles 26 are provided with a suitable chuck 28 to hold the drills 29. The spindles 26 are movable vertically to effect the drilling operation. The structure of the drilling mechanism per se, forms no part of this invention, but may be of any well known design or construction. The spindles 26 or drills 29 are located in a predetermined fixed position depending upon the spacing and location of the holes to be drilled. In this instance, the drills 29 are arranged to pass through and be guided by the drilling bushing 17 in plate 16 of the table structure.

It will be apparent thus far that any work located on the table 14 beneath the plate 16 may be drilled upon operation of the drilling mechanism.

The disks 30 are electro-types used for printing milk bottle caps and the like, and are provided at one side with a design and/or printed matter as by etching or otherwise. The periphery of the disks 30 is tapered, as shown in Figure 2, and the design and/or printed matter is etched upon the smaller side or face of the disk. These disks are fixed to a type plate by clamps coacting with the beveled peripheries, and the type plates with the disks secured thereto are used to print the web of paper passing through the cap making machine. In most instances, the printed matter and/or the design on the bottle cap is printed in two or more colors. This necessitates the use of a set of disks and a plate for each color used, and it is further necessary that the disk on each plate be arranged in an accurate definite relationship to the disk on the other plates. Each bottle cap customer uses an individual design, and individual lettering, to a great extent. This results in the necessity for changing the disks on the type plates for the manufacture of bottle caps for each customer. Heretofore, and up to the present time, the disks have been secured to the type plates and positioned as accurately as the judgment of the operator would permit. The cap making machine would then be started, the misalinement of the disks noted on the web, the machine stopped, and the disks manually adjusted. This fit and try method often consumed from one and one-half to two hours of the operator's time before he succeeded in getting the disk of each plate in proper register with the disks of the other plates.

With the apparatus herein described, the individual disks are operated upon by being drilled on their rear sides, and the drilled holes are arranged in a definite relationship to the design appearing on the front side of the disk. The drilled holes are made use of subsequently in locating the disks relatively on the type plates.

In order that the disks 30 may be properly held during the drilling operation, the block 19 is provided with a pair of inwardly extending ribs 31, and with a slidable jaw 32. The inner end of jaw 32 and the lower edges of the ribs 31 are formed to coact with the tapered periphery of the disks 30, and the jaw 32 is moved inwardly by a nut 33 threading on stem 34, the outer end of which is provided with a handle or knob 35.

The apparatus includes further an enclosed housing 36 secured to the depending portion 13 of support 11, as at 37, and is formed with an outwardly extending cylindrical portion 38, the upper end of which is truncated at a slight angle from the horizontal. Means for supporting a chart is arranged on the upper end of the cylindrical portion 38 of the housing, and comprises an annular member 39 in which is mounted a glass plate 40 on which the chart is secured.

A lamp housing 41 is supported on the housing 37 immediately below and at each side of the table 14, and a prismatic reflector 42 is arranged at the inner end of each lamp housing 41, and by which the light rays from the lamps are reflected in an upward and angular direction against the under side of the disks 30. The light rays are redirected from the disk downwardly through a tube 43 in which an optical train of the nature of a compound microscope is mounted, and by which a greatly enlarged image of the work, or a portion thereof, may be projected on the chart 44 mounted on the plate 40 by the aid of a reflector 45 mounted upon a stud 46 adjustably secured in the bottom of the housing 37. The chart 44 is formed of transparent or translucent material with opaque indicia or markings thereon.

The face of the disk 30, illustrated in the work holder in Figure 3, has the word "Certified" etched thereon, and the words "Pure Milk", appearing thereon in dotted outline, are etched on the face of the disk arranged in the succeeding type plate of the cap making machine. The necessity of one set of disks to print the word "Certified", and another set of disks to print the words "Pure Milk" results from the fact that the word "Certified" is printed in one color, and the words "Pure Milk" printed in another color.

When operating upon the disk provided with the word "Certified", the chart 44 is provided with certain indicia which may consist of an enlargement of the word "Certified", or may consist of the letter C on the left hand portion of the chart, and the letter D on the right hand portion, these being the first and last letters of the word "Certified", and these letters being proportionate to the complemental letters of the word "Certified" in both size and spacing. The proportion employed depends upon the relative adjustment of the optical system.

In operation, a master disk having, in this instance, the word "Certified" etched in its face is secured in the work holder 19. The master disk also has been previously drilled on the back side. The work holder 19 is now adjusted in the table structure until it is in position to receive the ends of the drills 29 in the previously drilled holes. The lamps in the housings 41 are illuminated and by the optical system previously described, the face of the disk 30, including the word "Certified", will be projected upon the chart 44. The chart 44 is then adjusted on the glass plate 40 until the letters C and D on the chart are in register with the projected letters C and D. The chart 44 is then secured to the chart support, and the master disk 30 removed from the work holder 19. Thereafter, each succeeding disk with the word "Certified" etched upon its face is secured in the work holder, the work holder inserted in the table structure and adjusted until the projected letters C and D register with the complemental letters on the chart 44. The drills 29 are then lowered through the guide bushing 17, and holes are drilled in the rear side of the disk 30 in the same exact definite relationship to the etched word "Certified", as are the holes in the master disk to the etched word "Certified" on said disk.

The words "Pure Milk" also appear on the chart 44 for the purpose of accurately positioning the disks having the words "Pure Milk" etched upon their faces. In lieu of the chart being provided with printing, as above described, the chart may be provided with any suitable indicia to serve as locating marks, such as the cross marks 50, and the type plates 30 are provided with similar marks. In this instance, the marks 50 on the type disks are etched in the face of the disk below the printing surface, and are initially located when the artist makes the original drawing for the design, or lettering, for the printing disks. That is, all of the printing and designs placed on any disk, or series of disks, is arranged in a definite relative position to the location marks 50, and the enlarged chart 44 is provided with similar markings.

It will be readily apparent that once the chart 44 is correctly positioned relative to the tool or drills 29, all succeeding disks are positioned and drilled in the same relationship to the design on the face of the disk. It will be understood that while the apparatus has been described in connection particularly with operations upon disks for printing bottle caps, any piece of work may be substituted for the disk and the work instead of being drilled may be processed in any manner by any form of tool.

A plurality of disks 30 may be formed in an integral plate, in which instance the box structure on the table 14 is of sufficient dimensions to accommodate the plate and provide for shifting of the same on the table 14, so that each disk portion of the plate may be brought into proper registration and alinement with the drills 29. After each of the disk portions of the plate have been drilled on their back sides, the disk portions are separately removed from the plate. In this instance, a work holder, or vise, is not necessary inasmuch as the size of the plate is sufficient for the operator to hold by hand during the drilling operation.

What I claim is:

1. A device for definitely positioning a piece of work relative to a tool comprising a suitable frame, a tool mounted in the frame and operable to operate on the work, a chart having indicia thereon representing a magnified portion of the work, means for supporting said chart with the indicia thereon in a predetermined fixed position relative to said tool, an optical system operable to reflect an image of the work on said chart, and means for shifting the work relative to the tool to bring the image of the work in register with the indicia on said chart.

2. A device for definitely positioning a piece of work relative to a tool comprising a suitable frame, a tool mounted in the frame and operable to operate on the work, a chart having indicia thereon representing a magnified portion of the work, means for supporting said chart with the indicia thereon in a predetermined fixed position relative to said tool, an optical system operable to reflect an image of the work on said chart, and means for shifting the work relative to the tool to bring the image of the work in register with the indicia on said chart, and means for holding said work during operation of the tool thereon.

3. An apparatus for definitely positioning a piece of work relative to a tool comprising a suitable frame, a tool mounted in the frame and operable to operate on the work, a work holder, means for supporting a chart having indicia thereon in a predetermined fixed position relative to said tool, an optical system operable to reflect an image of the work held in the work holder on said chart, said work holder being movable to shift the work relative to the tool to bring the image of the work in register with the indicia on said chart, and means for holding the work holder in such adjusted position during operation of the tool on said work.

4. An apparatus for accurately positioning a piece of work relative to a tool comprising a suitable frame, a tool mounted in the frame and operable to operate on the work, a work table carried by the frame and arranged in juxtaposition to said tool, a work holder, means for supporting a chart having indicia thereon in a predetermined fixed position relative to said tool, an optical system operable to reflect an image of the work when held in the work holder on said chart, said work holder being shiftable on the table to bring the image of the work in register with the indicia on the chart, and means for securing the work holder to said table in such adjusted position.

5. A device for accurately positioning a piece of work relative to a tool comprising a suitable frame, a tool mounted in the frame and operable to operate on the work, a table carried by the frame and being provided with an aperture, a work holder movably mounted upon said table, a light source arranged beneath the table and being operable to direct a beam of light through the aperture of the table on said work, means for supporting a chart having markings thereon in a predetermined fixed position relative to said tool, an optical system operable to collect the light beams directed against said work and project an image of the work on said chart, said work holder being shiftable on the table to bring the projected image in register with the markings on said chart, and means for securing said work holder to the table during operation of the tool upon the work.

6. An apparatus for accurately positioning a piece of work relative to a tool comprising a suitable frame, a tool mounted in the frame and operable to operate on the work, a table carried by the frame, said table being formed with an aperture extending therethrough, a work holder mounted on the table and arranged to position the work over said aperture, means for supporting a chart having indicia thereon in predetermined fixed relationship to said tool, a light source carried by the frame and arranged beneath the table at each side of said aperture and being operable to direct a beam of light through said aperture on the work, an optical system operable to collect the reflected rays of light from the work and project an image of the work on said chart, said tool holder being movable relative to the tool to bring the image of the work in register with the indicia on the chart.

7. The combination of a tool and a device for definitely positioning work to be operated upon by said tool, said device comprising a work holder, a tool arranged in juxtaposition to said work holder and being operable to operate upon the work, a chart having an indicia thereon located in a predetermined fixed position relative to said tool, an optical system operable to cast an image of the work on said chart, and said work holder being movable to shift the work to bring the image of the work in alinement with the indicia on said chart.

8. A device for definitely positioning a piece of work relative to a tool to operate thereon, comprising a suitable frame, a tool mounted in the frame and being operable to operate upon the work, a work holder, means for supporting a chart having an indicia thereon in a predetermined fixed position relative to said tool, an optical system operable to reflect an image of the work, when held in the work holder, on said chart, said work holder being movable to shift the work relative to the tool to bring the image of the work in alinement with the indicia on said chart.

9. An apparatus for accurately positioning a piece of work relative to a tool comprising a suitable frame, a tool mounted on the frame and being operable to operate upon the work, a work supporting table carried by the frame and arranged in juxtaposition to said tool, a chart supported by the frame and having indicia thereon arranged in predetermined fixed position relative to said tool, an optical system operable to reflect an image of the work, when positioned on said table, on said chart, said work being shiftable on the table to bring the reflected image of the work in register with the indicia on the chart.

10. A device for definitely positioning a piece of work relative to a tool comprising a suitable frame, a tool mounted on the frame and being operable to operate upon the work, means carried by the frame for supporting the work in juxtaposition to said tool, a support carried by the frame for supporting a chart having an indicia thereon, with the indicia arranged in a predetermined fixed position relative to said tool, an optical system operable to reflect an image on the work, when supported by said work support, on said chart, and means for effecting relative movement between the work and the tool and chart as a unit to bring the image of the work in register with the indicia on the chart.

JOHN F. PRICE.